W. P. Walter,
Tool for Making Plate Glass.
Nº 13,245.   Patented July 10, 1855.
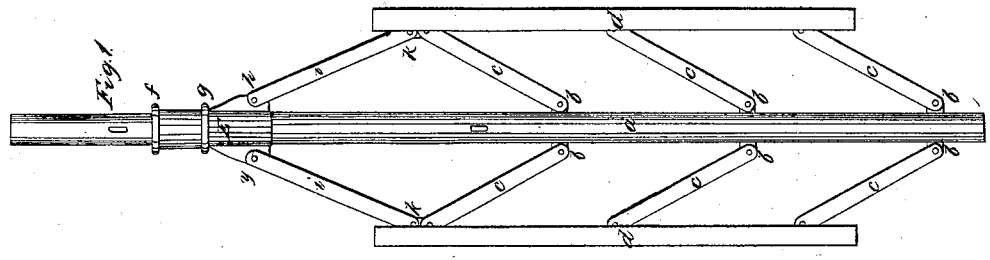
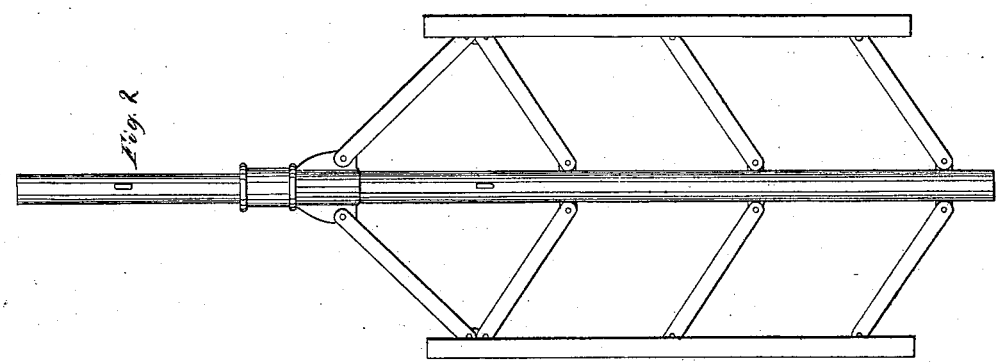
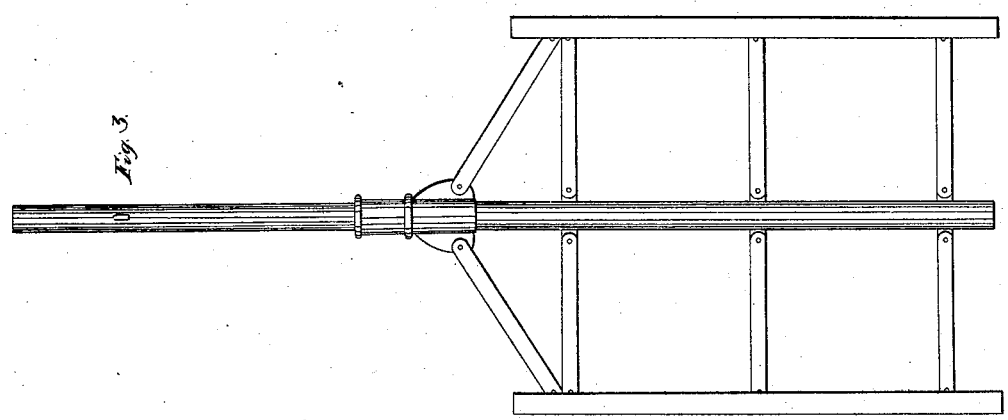
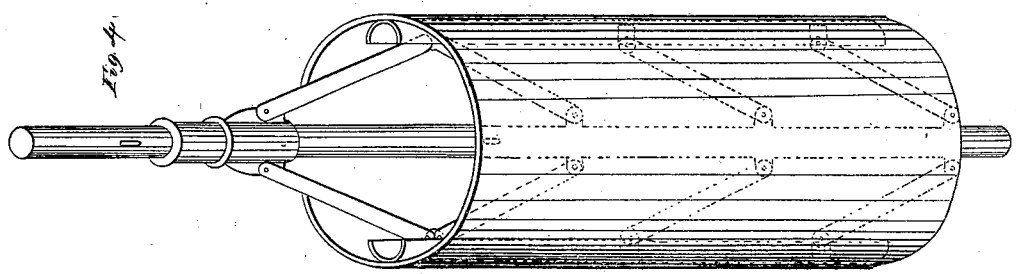

UNITED STATES PATENT OFFICE.

WM. P. WALTER, OF PHILADELPHIA, PENNSYLVANIA.

MANUFACTURING PLATE-GLASS FROM CYLINDERS.

Specification of Letters Patent No. 13,245, dated July 10, 1855.

*To all whom it may concern:*

Be it known that I, WM. P. WALTER, of the city of Philadelphia and State of Pennsylvania, have invented a new and useful Mode of Flattening Cylinder-Glass; and I do hereby declare that the following is a full and exact description thereof, reference being had to the accompanying drawings and to the letters of reference marked thereon.

The nature of my invention consists in flattening the glass cylinder by inserting the flattening instrument into the cylinder in the flattening furnace, and as the glass becomes soft from heat spreading out the wings of the instrument, thus causing the cylinder of glass to form an oblong shape with the two sides flat.

Figure 1, represents the flattening instrument contracted, Fig. 2, represents the flattening instrument partly expanded, Fig. 3, represents the flattening instrument expanded, Fig. 4, represents the flattening instrument with a cylinder of glass on it, preparatory to flattening it.

To enable others skilled in the art to make, and use my invention, I will proceed to describe its construction, and operation.

I construct my flattening instrument, with iron, steel, or other suitable metal. I take the rod or tube, *a*, to which the joints *b, b, b*, are fixed. To these joints, the rods *c, c, c*, are attached. I then take the rods *d, d*, provided also with joints to which, I attach the rods *c, c, c*. Then a slide *e*, is put upon *a*, provided with the collars *f* and *g*, at *h, h*, which are joints. The rods *i, i*, are attached to the first rods, *c, c*, at the joints *k, k*. By moving the slide *e*, upon the rod *a*, causes the rods *d, d*, to contract or expand at the will of the operator.

The operation of the flattening instrument is a follows. The cylinder to be flattened is gradually heated, in a heating chamber similar to those in use in the ordinary flattening kilns. It is then put into the furnace or kiln which I heat by two fires (one on each side). It may be done with one fire, and as soon as the cylinder is sufficiently heated, the flattening instrument is put into it, and the cylinder allowed to rest upon one of the wings or rods, till the cylinder is softened by heat. The operator then pushes with one hand the slide *e*, and pulls with the other hand the rod *a*, thus causing the wings, (or rods *d, d*,) of the instrument to expand. At the same time the instrument is revolved at the will of the operator, thus causing all parts of the cylinder to be equally heated which is essential for the glass to be well flattened, thus producing two flat sides. As soon as the sides are flat the operator removes it to the annealing oven or kiln where the glass is annealed in the usual manner.

The instrument may be expanded by holding the collars *f* and *g*, upon a hook bar, or its equivalent at the front of the flattening kiln or furnace, and pulling or pushing the rod *a*, or the collars *f*, and *g* may be put at the other end of the instrument and expanded, by pulling or pushing the rod *a*, but I prefer the first mentioned way as most convenient.

The advantages of this mode of flattening glass are, first, the glass retains its original brilliancy and polish of surface. Glass flattened in the usual way is generally burned and made rough upon its surface, and is always more or less "cockled" or of a wavey or uneven surface and in order to make the surface as good as when it comes from the hands of the "blower" it must be ground, smoothed, and polished which is an expensive operation; second, the expensive apparatus such as flattening stones and carriages are dispensed with.

Other plans have been tried to prevent the surface of cylinder glass "burning" and "cockling" so as to retain its original polish and brilliancy of surface, such as spreading the cylinder with bars or rods operated upon by screws or springs. These have not been successful, as they require more than one person to work them, and not being simple enough to be entirely under the control of the operator. By my invention the operator can move the glass cylinder into any part of the furnace, and cause it to revolve at pleasure, thus heating the glass equal in all its parts, and only acting upon the instrument as occasion requires, thus producing a flat and equal surface on both sides without breaking the glass, or injury to its original surface.

I am aware that cylinders of glass have been fashioned into an oblong shape with two flat sides by forcing them between two pieces of wood, in a heated state, also by holding them upon bars or rods in the kiln or furnace, and by "percelars" in the hands of the workman, as in flint glass works. The putting glass cylinders into an oblong shape is not new. This I do not claim. The stretching of glass is now new. Cylinder glass is stretched by the blower when he swings the hot glass in the operation of making the cylinder. Glass is also stretched in the operation of making glass tubes. Stretching glass I consider broad and do not claim it. But

What I claim and desire to secure by Letters Patent, as my invention is—

The forming of cylinder glass into an oblong shape with two flat sides, by my improved flattening instrument, substantially the same as set forth in my specification.

WM. P. WALTER.

Witnesses:
JOHN THOMPSON,
A. B. ASHMEAD.